(12) United States Patent
Dawson

(10) Patent No.: US 6,947,048 B2
(45) Date of Patent: Sep. 20, 2005

(54) METHOD FOR SHARING A GRAPHICS DISPLAY AS A RESOURCE IN AN EMBEDDED SYSTEM

(75) Inventor: Thomas P. Dawson, Escondido, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 142 days.

(21) Appl. No.: 10/624,821

(22) Filed: Jul. 21, 2003

(65) Prior Publication Data

US 2005/0018078 A1 Jan. 27, 2005

(51) Int. Cl.[7] .............................................. G06F 15/76
(52) U.S. Cl. ...................... 345/519; 718/104; 725/59; 725/61; 725/153
(58) Field of Search ................................ 345/501, 519, 345/502, 530; 719/321, 323, 324, 327, 328, 329; 348/460, 552, 571, 739; 725/32, 37, 39, 40, 43, 56, 59, 61, 140, 151–153; 718/1, 107, 100, 102–104

(56) References Cited

U.S. PATENT DOCUMENTS

| 5,455,958 | A | * | 10/1995 | Flurry et al. ................... 710/65 |
| 2001/0047435 | A1 | * | 11/2001 | Dove .......................... 709/310 |
| 2003/0227567 | A1 | * | 12/2003 | Plotnick et al. ............. 348/552 |
| 2004/0107451 | A1 | * | 6/2004 | Khandelwal et al. ....... 725/146 |

* cited by examiner

*Primary Examiner*—Kee M. Tung
(74) *Attorney, Agent, or Firm*—John P. O'Banion

(57) ABSTRACT

A system and method for managing graphics display associated with an embedded system where multiple application programs reside and the graphics display is accessible by the multiple application programs. The system includes a graphics resource manager which prevents the application programs from accessing the graphics display at the same time.

24 Claims, 3 Drawing Sheets

METHOD FOR SHARING A GRAPHICS DISPLAY AS A RESOURCE IN AN EMBEDDED SYSTEM

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to graphics displays, and more particularly to systems for managing application program access to graphics displays.

2. Description of Related Art

A graphics (e.g., video) display device used in an embedded system is an important resource for applications running on the embedded system. Often, two or more application programs in the embedded system compete for access to this resource. Typically, in embedded systems, there have been two approaches to managing how to share the screen display among different applications that wish to display, for example, a graphical user interface (GUI).

For example, one approach is to include a window management system such as "X window" or "Qt Embedded" from TrollTech Corp. In this approach, the window management system "owns" the screen display as a resource and any application wishing to display a GUI must use the application program interface (API) libraries the window manager provides. In this method, applications do not "own" the screen display as a resource and must layer their specific GUI design over what is provided by the window management system. Unfortunately, with this management approach a relatively large amount of system memory is required by the window manager. Moreover, the processing required by the embedded system to share the screen display with multiple applications depletes central processing unit (CPU) cycles and lowers overall performance of the embedded system.

A second approach for managing a screen display currently in use includes having one master application, such as a web browser, that has complete control of the screen display. In this approach, all other applications, such as an embedded device control application, an e-mail application, etc., are written as "plug-in" software to the web browser. In this approach, the screen display resource is the web browser and all applications are written as browser add-ons. As such, instead of having a set of independent applications, all applications are combined into one large application.

As can be seen, therefore, there is a need for a system and method for allowing multiple applications to have full "ownership" of a screen display as a resource while still allowing the screen display to be shared by independent applications. There is also a need for such as system and method that minimizes its use of system memory and that does not rob the system of CPU cycles. The present invention satisfies those needs, as well as others, and overcomes drawbacks in current screen display management approaches.

BRIEF SUMMARY OF THE INVENTION

The present invention addresses the need for efficient management of graphics screen displays through the use of a background task, called a Graphics Resource Manager (GRM), that coordinates access to the graphics display device among independently executable application programs. According to an aspect of the invention, each application program has full "ownership" of the graphics display device and is not constrained by a predefined Application Program Interface (API). In accordance with another aspect of the present invention, each application program that uses a graphical user interface (GUI) or the like informs the background GRM task that it is finished when it exits or suspends. According to a still further aspect of the invention, an application program is not allowed to invoke another application that would be a separate process that would independently seek to use the frame buffer. As a result, there is no competition for the graphics display device. In accordance with another aspect of the invention, the information communicated to the GRM task may also include a request for a new application program to be brought up or for any graphics related display to be discontinued until requested again by the user. Note that access to the graphics display device is serial; even though an application program "owns" the display when it has access to the display, only one application program is allowed access to the display at a time.

In one embodiment, the embedded system includes programming for managing access to the graphics display by the application programs. For example, a first application program can be selected via an on-screen display (OSD) that displays a main menu which provides an interface to the user. When the first application is exited, a message is sent to the GRM that the first application has been exited and the GRM can, again, display the main menu. Thereafter, a second application can be selected using the main menu. When the second application is exited, a message is sent to the GRM which then displays the main menu for further selection or exiting from the main menu. Preferably, when a user selects to exit the main menu, it is exited and the GRM suspends the OSD.

In another embodiment, the embedded system resides in a television which functions as the graphic display device and multiple applications programs, as well as the GRM, reside within the embedded system. Again, in this embodiment of the invention, the GRM allows access to the graphics display by one and only one application within the embedded system at a time. In this embodiment, when the on-screen display is exited instead of an application program being selected, television content can then be displayed.

A still further aspect of the invention is a method for managing a graphics display. The method includes providing an OSD. Multiple applications are provided and access is allowed to the graphics display by one and only one application at a time.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention will now be described with reference to the system generally shown in FIG. 1 and the method(s) generally shown in FIG. 2 and FIG. 3. It will be appreciated that the system may vary as to configuration and as to details of the components, and that the method may vary as to the specific steps and sequence, without departing from the basic concepts as disclosed herein.

Figure 1:
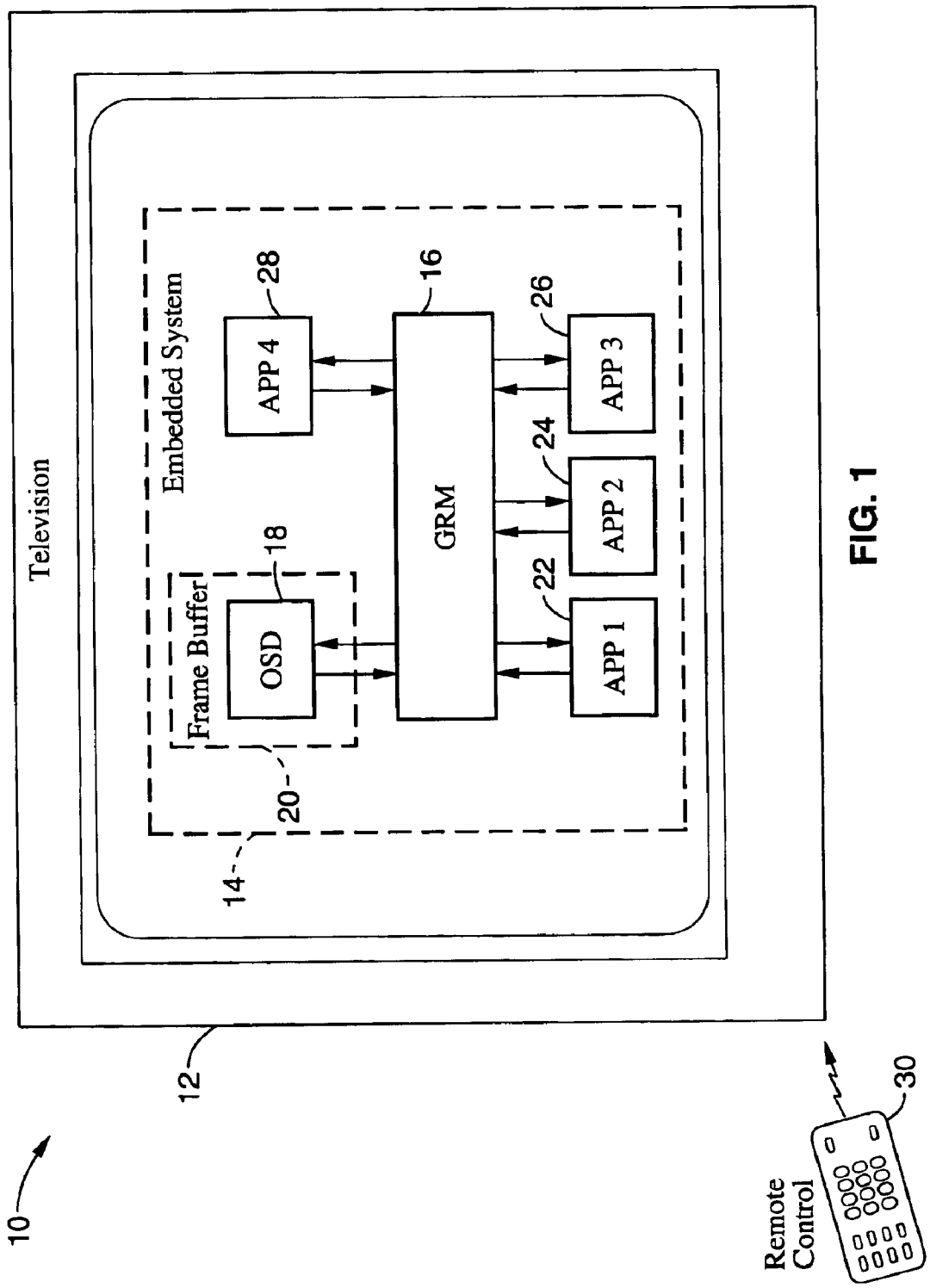
FIG. 1 is a block diagram of an embodiment of a system for managing a graphics screen display according to the present invention which is incorporated into a television.

FIG. 1 shows an embodiment of a system, generally designated 10, for managing a graphics display according to the present invention. In the embodiment shown, the system 10 includes a television 12 which provides the graphics display device. It will be appreciated, however, that the invention is not limited to use in connection with a television but can be used in connection with other video display devices. Use of the invention in connection with a television is intended to illustrate the features and configuration of the invention.

In the illustrated embodiment, an embedded system 14 is installed within the television 12. It will be appreciated that embedded system 14 would typically comprise one or more microprocessors and associated memory for program execution, solid state or other conventional memory storage devices, controllers, interfaces, etc. FIG. 1 shows a graphics resource manager program (GRM) 16, described in detail below, that would be executable by the embedded system 14 in accordance with the present invention and communicate with the graphics display (e.g., television 12) to provide an on-screen display (OSD) 18 for function selection. In a preferred embodiment, a main menu application or the like creates pixel data used to represent the OSD 18 and the pixel data used to represent OSD 18 is stored in a frame buffer 20 but other means such as a dedicated region of memory may be employed as well. As shown in FIG. 1, the GRM 16 can also communicate with a plurality of application programs, shown here by way of example as a first application program 22, a second application program 24, a third application program 26, and a fourth application program 28 which is the main menu application program. It can be appreciated that the application programs 22, 24, 26, 28 can be web browsers, games, programming applications, etc. Moreover, it can be appreciated that more or less than four application programs can communicate with the GRM 16 within the embedded system 14.

FIG. 1 further shows a remote control 30 that communicates with the television 12. In addition to standard television controls, such as volume, channel, etc., the remote control 30 can be used to access the embedded system 14 within the television 12 and further cause the application programs 22, 24, 26, 28 within the embedded system 14 to be executed serially. It will be appreciated that the GRM 16 can include an interface with to the remote control 30 that can be used when the OSD 18 is "off".

Preferably, the GRM 16 is a relatively small background task running within the embedded system 14. The GRM 16 can be used to coordinate between the independently executable application programs 22, 24, 26 according to their selection through the main menu that is presented by main menu application program 28. With this system, each application program 22, 24, 26, 28 has full "ownership" of the graphics display and is not constrained by a predefined application program interface (API). Moreover, each application program 22, 24, 26, 28 can simply inform the GRM 16 that it is finished with the graphics display when it exits or suspends, so as to release the graphics display for access by another application program.

FIG. 1 shows the GRM 16 interacting with the OSD 18 and four application programs 22, 24, 26, 28. In this regard, it is to be understood that the system 10 runs serially. In other words, only one application program 22, 24, 26, 28 can access the graphic display device at a time. Preferably, an application program cannot invoke another application that would independently seek to use the graphics display; accordingly, the application programs do not compete with each other for access to the graphics display. The information communicated to the GRM 16 can also include a request for a new application to be brought up or for any graphics related display to be discontinued until requested again by the user.

As stated above, in a preferred embodiment, the OSD 18 can be stored within the frame buffer 20, such as a standard frame buffer provided by Linux. The frame buffer 20 can be opened and addressed by a single application program at a time. Moreover, the GRM 16 can be used to coordinate which application has been granted use of the frame buffer 20 at any given time. The product domain is an embedded system where all applications are provided by the developer of the embedded system. Given this, the application programs 22, 24, 26, 28 can be tailored to interact as needed with the GRM 16 as it coordinates access to the frame buffer 20.

Note that the low resolution of typical embedded systems makes layered application windows, as in a window management system, somewhat unusable. Thus, the ability to layer multiple application windows one at a time on the display is unnecessary.

Although in a preferred embodiment, the present invention can utilize a frame buffer 20, it can be appreciated that other means can be used. For example, a dedicated region of memory for a device display can be used. Note that some embedded systems do not use the "frame buffer model" for graphics display; instead, they have an agreed upon region of memory where anything written to that region appears on the display.

In a hardware system that employs multiple overlaid graphics planes, the GRM of the present invention can coordinate which application is assigned to which graphics overlay plane. Moreover, a unique GRM can be provided for each graphics overlay plane. In such a system, a unique subset of applications can be assigned to each GRM. In this way, selecting to view an application such as e-mail would not be ambiguous to the system.

It can be appreciated that this invention can also be used to coordinate which application has access to the system audio capabilities. In addition, the GRM 16 provided by the present invention, can be used with set top boxes, GPS handhelds, and other devices that have or interface with a display.

Figure 2:
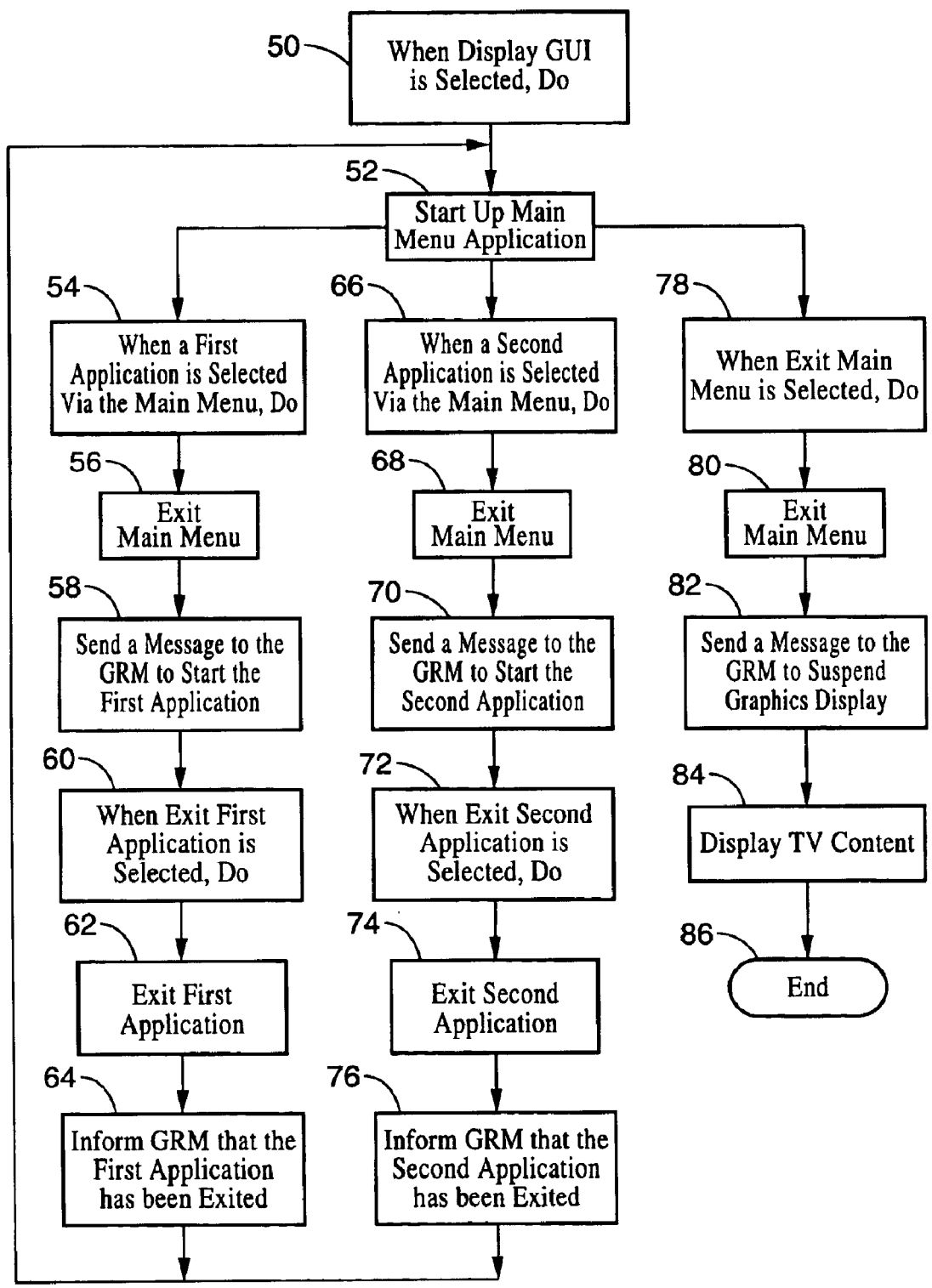
FIG. 2 is a flow chart of a method for managing a graphics screen display according to the present invention.

Referring now to FIG. 2, an embodiment of the operating logic according to the present invention is shown. It will be appreciated that this logic would be implemented in software and/or firmware using conventional programming techniques, that is executable by the embedded system. The logic commences at block 50 with a do loop, wherein when it is selected to display the GUI, such as the main menu, the following steps are performed. At block 52, the main menu application program is started. Once the main menu application program is started, a user has several options. At block 54, when a first application is selected via the main menu, the following steps are performed. At block 56, the main menu application program is exited. Then, at block 58, a message is sent to the GRM 16 to start the first application program.

When the user decides to exit the first application program at block 60, the logic moves to block 62, where the first application program is exited. Proceeding to block 64, the GRM 16 is informed that the first application program has been exited. The logic then returns to block 52 and the main menu application program is, again, started.

Continuing to block 66, when a second application program is selected via the main menu, the following steps are performed. As shown, the main menu application program is exited at block 68. Moving to block 70, a message is sent to the GRM 16 to start the second application program. Thereafter, when the user decides to exit the second application program at block 72, the logic proceeds to block 74, where the second application program is exited. At block 76, the GRM 16 is informed that the second application has been exited. The logic then returns to block 52 and the main menu application program is, again, started.

From block 52, the logic can move to block 78 wherein when the user decides to exit the main menu, the logic moves to block 80 and the main menu application program is exited. At block 82, a message is sent to the GRM 16 to suspend the graphics display, e.g., the main menu. Thereafter, at block 84, TV content can be displayed. The logic then ends at state 86.

It is to be understood that in the above logic, the applications can be, for example, web browsers, games, etc. Thus, a user can access a web browser via the main menu and then, once the user quits the web browser the main menu is again presented. A user can then access a game via the main menu. The GRM 16 prevents the graphics display from being accessed by more than one application program at a time.

It can be appreciated that the GRM 16 is in charge of creating application processes as called for and monitoring those processes for error conditions (e.g. abnormal child process termination). As such, the GRM 16 can include code that can handle such a situation should it occur. Moreover, the GRM 16 can, if needed, start processes with a given set of parameters or pass information to them as part of their initialization. The GRM 16 can also receive information from an application as it exits, such as a user request for a particular action or the initiation of another application. Accordingly, the GRM 16 can contain a state table, or some other algorithm, to determine what action to take based on the information returned from an application when it exits. It is to be understood that the GRM 16 would typically not exit, as in end the process, but suspend itself while the applications are running.

The GRM 16 can be resident in memory and ready to go when the called for application exits. Further, one or more selected applications, other than the GRM 16, depending on the implementation, may not exit but release resources and suspend processing until needed again. For example, as stated above, one such process can be the OSD 18 main menu display.

Figure 3:
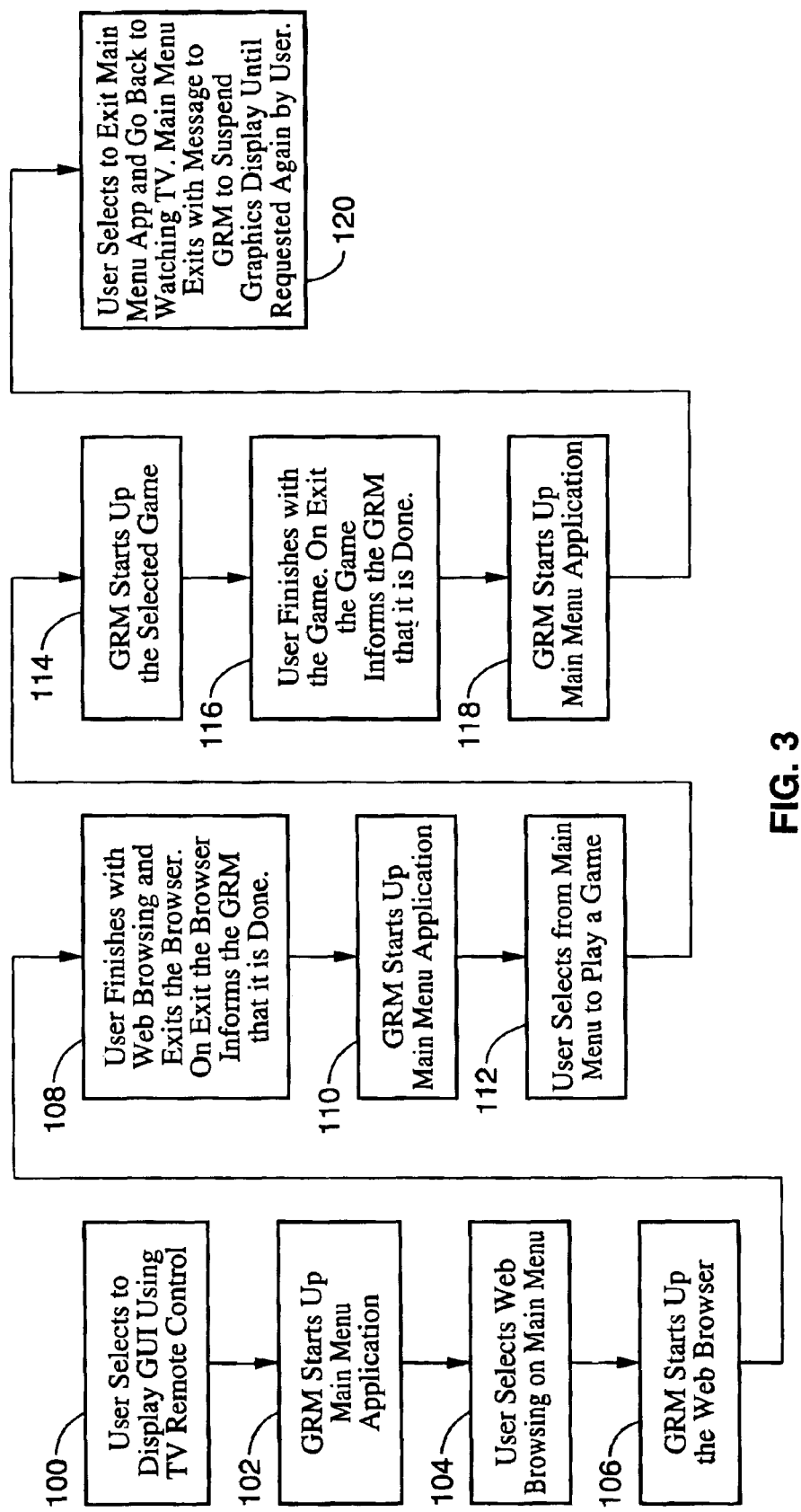
FIG. 3 is a second flow chart of a method for managing a graphics screen display according to the present invention.

Referring now to FIG. 3, a further example of the logic sequence according to the present invention is shown. In the example illustrated in FIG. 3, the user selects to display the GUI using a television remote control at block 100. In response, the GRM starts the main menu application program at block 102. Next, at block 104, the user selects for example web browsing on the main menu. The main menu application program then exits with a message to the GRM to bring up the web browser, and the GRM brings up the web browser at block 106. When the user finishes with web browsing and exits the web browser at block 108, the web browser informs the GRM that its session has been completed. Next, at block 110, the GRM starts the main menu application program. At block 112, the user selects, for example, playing a game on the main menu. The main menu application program then exits with a message to the GRM to bring up the game and the GRM starts the selected game at block 114. When the user finishes with the game at block 116, the game informs the GRM that it has finished. Next, at block 118, the GRM starts the OSD application. If the user is finished with selecting embedded applications, at block 120 the user selects to exit the main menu application program and, for example, resume watching television. In this case, the main menu application program exits with a message to the GRM to suspend graphics display until requested again by the user.

Although the description above contains many details, these should not be construed as limiting the scope of the invention but as merely providing illustrations of some of the presently preferred embodiments of this invention. Furthermore, it will be appreciated that the invention is preferably implemented using software, and that the software can be coded using conventional programming techniques in accordance with the description above. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus An apparatus for managing a graphics display associated with an embedded system, said graphics display accessible by at least a first and second application program executable by said embedded system, said apparatus comprising;

a graphics resource manager executable by said embedded system;

wherein said graphics resource manager is configured to prevent simultaneous access of said graphics display by said application programs; and wherein said embedded system includes programming for carrying out the operations of:

displaying an on-screen display;
selecting the first application via the on-screen display;
exiting the on-screen display when the first application is selected; and
sending a message to the graphics resource manager to start the first application program when the first application program is selected.

2. An apparatus as recited in claim 1, wherein said embedded system further includes programming for carrying out the operations of:
selecting to exit the first application;
exiting the first application;
sending a message to the graphics resource manager when the first application has been exited; and
displaying the on-screen display.

3. An apparatus as recited in claim 2, wherein said embedded system further includes programming for carrying out the operations of:
selecting the second application via the on-screen display;
exiting the on-screen display when the second application is selected; and
sending a message to the graphics resource manager to start the second application when the second application is selected.

4. An apparatus as recited in claim 3, wherein said embedded system further includes programming for carrying out the operations of:
selecting to exit the second application;
exiting the second application;
sending a message to the graphics resource manager when the second application has been exited; and
displaying the on-screen display.

5. An apparatus as recited in claim 4, wherein said embedded system further includes programming for carrying out the operations of:
selecting to exit the on-screen display;
exiting the on-screen display; and
sending a message to the graphics resource manager to suspend the on-screen display.

6. An apparatus as recited in claim 5, wherein said embedded system further includes programming for carrying out the operations of:
displaying television content.

7. An apparatus for managing a graphics display associated with an embedded system, said graphics display accessible by at least a first and second application program executable by said embedded system, said apparatus comprising:
a microprocessor;
means, executable by said microprocessor, for preventing simultaneous access of said graphics display by said application programs;
wherein said means for preventing simultaneous access of said graphics display by said application programs comprises a graphics resource manager program; and
programming for carrying out the operating of:
displaying an on-screen display;
selecting the first application via the on-screen display;
exiting the on-screen display when the first application is selected; and
sending a message to the graphics resource manager program to start the first application program when the first application program is selected.

8. A system as recited in claim 7, further comprising programming for carrying out the operations of:
selecting to exit the first application;
exiting the first application;
sending a message to the graphics resource manager program when the first application has been exited; and
displaying an on-screen display.

9. A system as recited in claim 7, further comprising programming for carrying out the operations of:
selecting the second application via the on-screen display;
exiting the on-screen display when the second application is selected; and
sending a message to the graphics resource manager program to start the second application when the second application is selected.

10. A system as recited in claim 9, further comprising programming for carrying out the operations of:
selecting to exit the second application;
exiting the second application;
sending a message to the graphics resource manager program when the second application has been exited; and
displaying the on-screen display.

11. A system as recited in claim 10, further comprising programming for carrying out the operations of:
selecting to exit the on-screen display;
exiting the on-screen display; and
sending a message to the graphics resource manager program to suspend the on-screen display.

12. A system as recited in claim 11, further comprising programming for carrying out the operations of:
displaying television content.

13. In an embedded system having a graphics display accessible by at least a first and second application program executable by said embedded system, the improvement comprising:
a graphics resource manager program executable by said embedded system;
wherein said graphics resource manager program is configured to prevent simultaneous access of said graphics display by said application programs; and
programming for carrying out the operations of:
displaying an on-screen display;
selecting the first application via the on-screen display;
exiting the on-screen display when the first application is selected; and
sending a message to the graphics resource manager program to start the first application program when the first application program is selected.

14. An improvement as recited in claim 13, further comprising programming for carrying out the operations of:
selecting to exit the first application;
exiting the first application;
sending a message to the graphics resource manager program when the first application has been exited; and
displaying the on-screen display.

15. An improvement as recited in claim 14, further comprising programming for carrying out the operations of:
selecting the second application via the on-screen display;
exiting the on-screen display when the second application is selected; and
sending a message to the graphics resource manager program to start the second application when the second application is selected.

16. An improvement as recited in claim 15, further comprising programming for carrying out the operations of:

selecting to exit the second application;

exiting the second application;

sending a message to the graphics resource manager program when the second application has been exited; and displaying the on-screen display.

17. An improvement as recited in claim 16, further comprising programming for carrying out the operations of:

selecting to exit the on-screen display;

exiting the on-screen display; and sending a message to the graphics resource manager program to suspend the on-screen display.

18. An improvement as recited in claim 17, further comprising programming for carrying out the operations of:

displaying television content.

19. A method for managing a graphics display associated with an embedded system wherein said graphics display is accessible by at least a first and second application program executable by said embedded system, comprising:

providing a graphics resource manager program executable by said embedded system;

wherein said graphics resource manager program is configured to prevent simultaneous access of said graphics display by said application programs; and wherein said embedded system includes programming for carrying out the operations of:

displaying an on-screen display;

selecting the first application via the on-screen display;

exiting the on-screen display when the first application is selected; and sending a message to the graphics resource manager program to start the first application program when the first application program is selected.

20. A method as recited in claim 19, wherein said embedded system further includes programming for carrying out the operations of:

selecting to exit the first application;

exiting the first application;

sending a message to the graphics resource manager program when the first application has been exited; and displaying the an-screen display.

21. A method as recited in claim 20, wherein said embedded system further includes programming for carrying out the operations of:

selecting the second application via the on-screen display;

exiting the on-screen display when the second application is selected; and sending a message to the graphics resource manager program to start the second application when the second application is selected.

22. A method as recited in claim 21, wherein said embedded system further includes programming for carrying out the operations of:

selecting to exit the second application;

exiting the second application;

sending a message to the graphics resource manager program when the second application has been exited; and displaying the on-screen display.

23. A method as recited in claim 22, wherein said embedded system further includes programming for carrying out the operations of:

selecting to exit the on-screen display;

exiting the on-screen display; and sending a message to the graphics resource manager program to suspend the on-screen display.

24. A method as recited in claim 23, wherein said embedded system further includes programming for carrying out the operations of:

displaying television content.

\* \* \* \* \*